United States Patent [19]
Eide et al.

[11] Patent Number: 5,810,652
[45] Date of Patent: Sep. 22, 1998

[54] MACHINE FOR CUTTING AWAY UNDESIRED TISSUE FROM E.G. FISH FILLETS

[75] Inventors: Ragnar Eide, Stavanger; Harald Johan Thorsen, Hafrsfjord, both of Norway

[73] Assignee: Trio Industrier AS, Forus, Norway

[21] Appl. No.: 849,153

[22] PCT Filed: Nov. 24, 1995

[86] PCT No.: PCT/NP95/00217

§ 371 Date: May 28, 1997

§ 102(e) Date: May 28, 1997

[87] PCT Pub. No.: WO96/16554

PCT Pub. Date: Jun. 6, 1996

[30] Foreign Application Priority Data

Nov. 29, 1994 [NO] Norway .................................. 944563

[51] Int. Cl.⁶ .......................... A22C 25/17; A22C 25/18
[52] U.S. Cl. .......................................... 452/125; 452/161
[58] Field of Search .................................. 452/161, 125, 452/126

[56] References Cited

U.S. PATENT DOCUMENTS

| | | | |
|---|---|---|---|
| 1,936,688 | 11/1933 | Rieske et al. | 452/127 |
| 1,993,899 | 3/1935 | Rieske | 452/127 |
| 2,380,755 | 7/1945 | Hendrickson | 452/127 |
| 2,568,489 | 9/1951 | Duggan | 452/127 |
| 3,460,193 | 8/1969 | Yoshida . | |
| 3,840,939 | 10/1974 | Yamanashi . | |
| 4,378,613 | 4/1983 | Crouch | 452/127 |
| 4,577,371 | 3/1986 | Simon | 452/127 |
| 4,628,570 | 12/1986 | Wenzel | 452/127 |
| 4,835,817 | 6/1989 | Jürs . | |
| 5,507,690 | 4/1996 | Eide | 456/126 |

FOREIGN PATENT DOCUMENTS

| | | |
|---|---|---|
| 1330477 | 7/1994 | Canada . |
| 463701 | 1/1992 | European Pat. Off. . |
| 1753121 | 7/1971 | Germany . |
| 155682 | 2/1987 | Norway . |
| 162694 | 10/1989 | Norway . |
| 163351 | 2/1990 | Norway . |
| 170191 | 6/1992 | Norway . |
| 174652 | 3/1994 | Norway . |
| 175032 | 5/1994 | Norway . |
| 2149645 | 6/1985 | United Kingdom . |
| 93/22929 | 11/1993 | WIPO . |

OTHER PUBLICATIONS

Norwegian Laying–Out Publication No. 163,351 Abstract.

*Primary Examiner*—Willis Little
*Attorney, Agent, or Firm*—Andrus, Sceales, Starke & Sawall

[57] ABSTRACT

A machine for cutting away undesired tissue (VP), e.g. fat tissue from fish fillets (F), said undesired tissue (VP) extending substantially in one main direction e.g. in the longitudinal direction of a fish fillet, comprises a rotary freezing drum (7) for freezing fillets (F) thereto in order to retain the fillets while a knife (18) cuts a fish meat slice (FS) loose from the freezing drum (7), a conveyor (3) being adapted to supply fillets (F) to the freezing drum (7). The freezing drum (7) is formed with at least one circumferential groove (7a) receiving said fat tissue portion (VP), an underlying conveyor (3), through the shape, design and suspension thereof, being adapted to press said fat tissue portion (VP) into the groove (7a) within which the fat tissue portion (VP) freezes and, thus, is retained, withdrawn from the drum mantle face (7') when the knife (18) cuts loose a fish slice (FS) freed from fat tissue.

10 Claims, 4 Drawing Sheets

MACHINE FOR CUTTING AWAY UNDESIRED TISSUE FROM E.G. FISH FILLETS

BACKGROUND OF THE INVENTION

The present invention relates to a machine for cutting away undesired tissue, e.g. fat tissue, fatty tissue, tissue exhibiting an undesired colour and, generally, any undesired tissue from fillets/pieces of meat, e.g. fish fillets.

Particularly, the invention relates to cutting away fat and dark meat in the form of fat tissue from fish fillets, where such fat tissue, in addition to just beneath the skin, extends in the longitudinal direction of the fillets approximately in the middle of each fillet/fish side piece, exhibiting an approximately triangular cross-section.

These longitudinal fat tissue portions are perhaps most distinctive in mackerel, trout, salmon and other fat fish, but exist also in saithe, pollack and other lean fish. In mackerel, the fat tissue portions are dark and very fatty.

It is desired to cut away dark, fat meat portions, thus making the fillet more delicious, as well as reducing the possibility of the meat getting turned rancid. It is desired to cut away fat portions of animal meat in order to make the fillet/piece more delicious and leaner.

At present, there exists only one efficient way of removing undesired fatty tissue portions, namely to cut them away manually. Attempts to provide a mechanical cutting away have hitherto been less successful.

SUMMARY OF THE INVENTION

The object of the invention is to provide an efficient machine for cutting away undesired tissue, e.g. fat tissue, fatty tissue, tissue having an undesired colour and, generally, any kind of undesired tissue from fillets/pieces of meat, e.g. fish fillets.

The object is achieved through features as defined in the accompanying claim 1.

When skinning fish fillets, it is generally known to use a freezing drum to which the fillets, skin on, are frozen skin side against the freezing drum, so that the fillets are maintained safely on the freezing drum during the subsequent skinning operation which, conventionally, is implemented by means of a driven endless band knife, the cutting edge thereof extending parallel to the longitudinal axis of the freezing drum, said cutting edge being situated at such a distance from the drum face that the skin, after the cutting operation, still sticks to the freezing drum, while the fillet in skinfree condition is separated therefrom.

The fillets with the skins on are supplied to the freezing drum lying on a conveyor, the tensioning thereof within the fillet delivery area adjacent the freezing drum being adjusted according to problemfree delivery of the fillets, the longitudinal direction thereof extending in the circumferential and rotational direction of the freezing drum.

In accordance with the present invention, the removal of said dark fat tissue portions of fish fillets and fillets of animal meat shall be implemented by means of such a freezing drum known per se as well as a supply conveyor assigned thereto. When treating fish fillets, it is suitable to effect skinning simultaneously as cutting away said fat tissue.

In connection with skinning and cutting away undesired fat tissue portions from fish fillets, the fillets may also be divided as known per se along one or more planes parallel to the two opposite main faces of the fillets.

A machine for cutting away undesired fat tissue portions, possibly in connection with skinning and possibly in association with said longitudinal dividing of the fillets, is adapted to treat fillets where undesired fat tissue portion substantially extends in one main direction (in the longitudinal direction of fish), so that the undesired fat tissue portion upon the freezing of the fillet on the rotary drum will extend substantially in the circumferential direction thereof.

Thus, in accordance with the invention, a machine for cutting away undesired fat tissue portion comprises i.e. a rotary freezing drum, a supply conveyor for fillets being assigned thereto, the freezing drum being formed with at least one circumferential groove adapted to accommodate a fat tissue portion pressed into the same.

When a fillet is fed towards the rotary freezing drum, the undesired longitudinal fat tissue portion of the fillet will land in the outer opening portion of the circumferential groove and be pressed into the latter. Within the groove, the fat tissue portion freezes so that it is anchored thereto (and so does the skin resting against the drum face if a skinning of fish fillets is performed simultaneously). When the fillet frozen to the freezing drum, subsequently passes the rotary band knife, the latter cuts loose and separates the skinned (skinfree), fat tissue-free fillet, fat tissue and skin frozen firmly to the freezing drum being removed from the drum through a scraping operation as known per se by means of scraper means.

The supply conveyor, preferably consisting of parallel single threads, has a controllable tensioning in order to be adjusted to the desired degree of pressing-in (of the tissue into said groove) and the pressing force which, in other respects, acts on the fillet.

A groove cross-section formed into the freezing drum may be adjusted to receive mutually differing fat tissue portion sizes. Thus, one takes as a starting-point a relatively deep groove, the conveyor positioned below the drum pressing the entire fat tissue portion into the groove, filling the latter only partly, a larger fillet having a more comprehensive fat tissue portion needing an increase in the upwardly directed pressure from the conveyor against the fillet on the freezing drum, so that all of the larger fat tissue portion is pressed into the groove, more or less filling the same.

The freezing drum may be assigned rotary scraper means known per se, e.g. one means scraping the drum mantle face free of skin and one means scraping within said groove to clean it. Alternatively, one or more scraper means may be shaped and designed for scraping both along the drum mantle face and within said groove.

BRIEF DESCRIPTION OF THE SEVERAL VIEWS OF THE DRAWING

Further features, advantages and details of a machine shaped and designed in accordance with the invention appear from the following description of an exemplary embodiment with reference to the attached drawings, wherein.

DETAILED DESCRIPTION OF THE INVENTION

Figure 1:
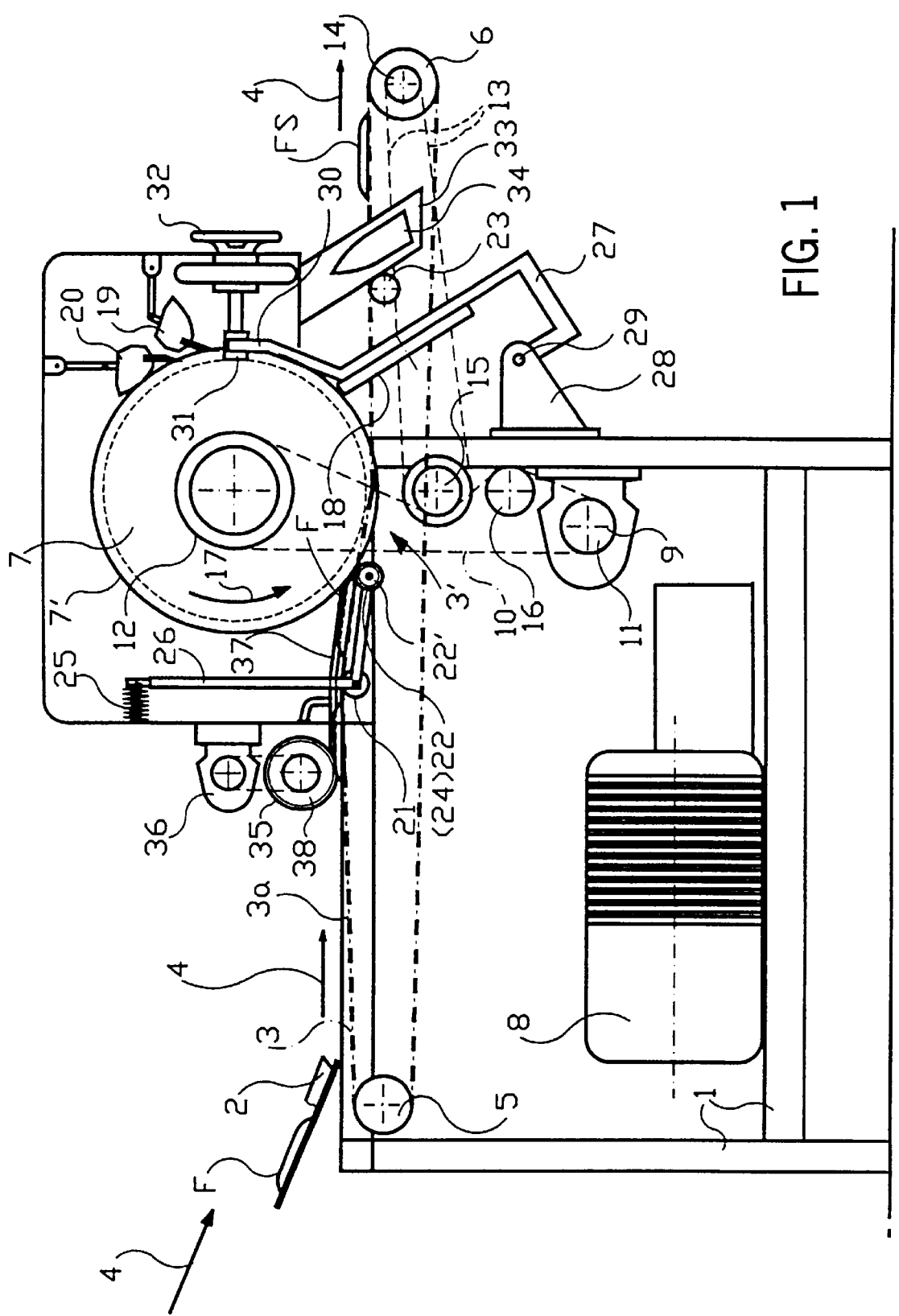
FIG. 1 shows a side elevational view of the machine according to the invention.

On the drawings, reference numeral 1 denotes the machine frame, at one end thereof is mounted a supply chute 2 for supplying fish fillets F to an endless conveyor 3 extending in the longitudinal direction 4 of the machine, corresponding to the feed direction for the fillets, the conveyor 3 passing around a turning roller 5 at the upstream end of the machine and a combined turning and drive roller 6 at the downstream and outlet end of the machine (feed-out end for treated fillets FS).

Figure 4:
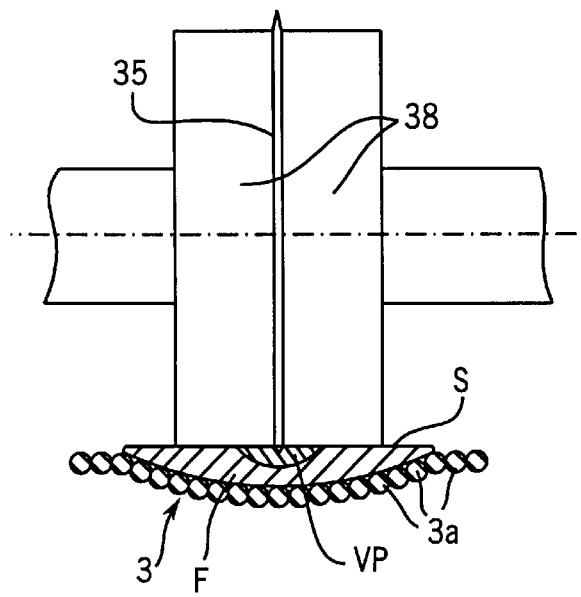
FIG. 4 shows the same as FIG. 3, the view rotated 90°, the fillet and conveyor shown in a vertical cross-section.
Figure 5:
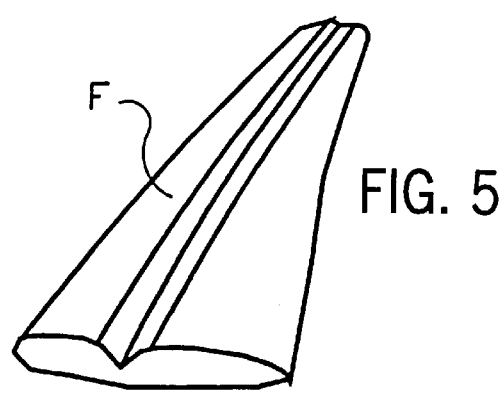
FIG. 5 shows a finished treated fillet where skin and longitudinal fat portion have been removed.
Figure 6:
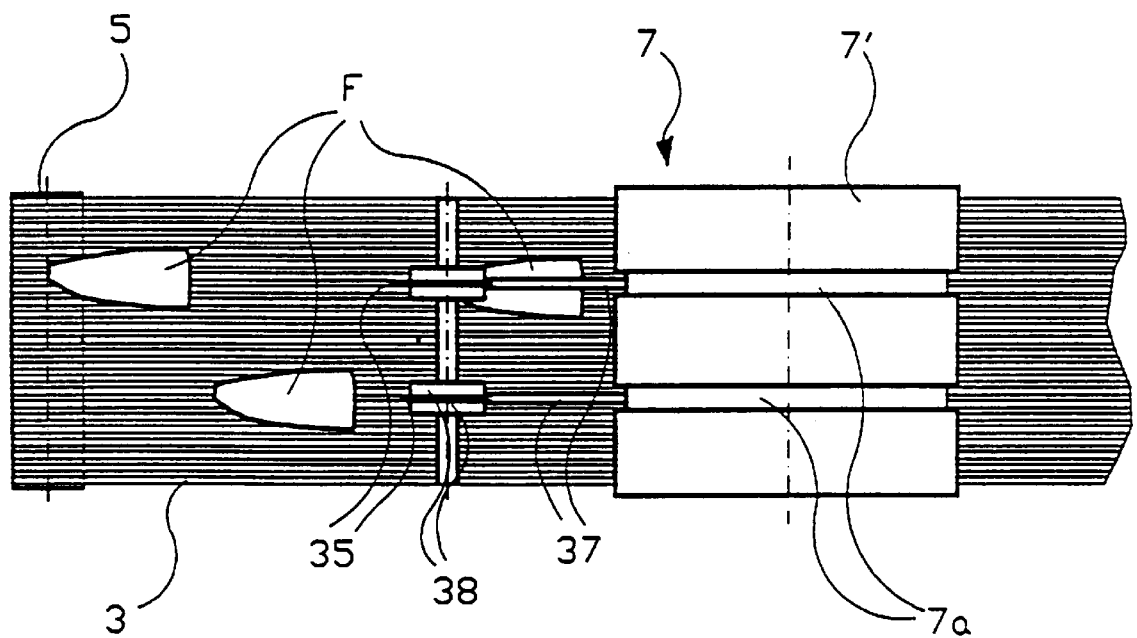
FIG. 6 shows a section of the machine, where the freezing drum circle knife and conveyor carrying three fillets are seen from above. This figure shows a freezing drum having two circumferential grooves and two circle knives simultaneously working on fish fillets supplied to the freezing drum in two rows.

The conveyor 3 may be built up and supported in various way. One suitable conveyor structure consists in accordance with FIGS. 2 and 4 of single threads, cords or strings 3a which, easier than a coherent band or tape, can adapt itself to the shape of the fillet F, the skin and fat tissue portion VP of which one desires to remove.

The fat tissue portion may have varying cross-sectional shape, but in fat fish of all kinds said portion has a substantially triangular cross-section, where one of the sides of the triangle extends adjacent the inner side av the skin S.

The mantle face of the freezing drum 7 is denoted at 7' and the freezing aggregate thereof at 8.

A gear motor 9 mounted on the machine frame 1, serves to drive both the freezing drum 7 and the conveyor 3. A first chain 10 has been passed around a chain wheel 11 on the outgoing shaft of the gear motor 9 and around a chain wheel 12 on a drive grommet on the freezing drum 7, while a second chain 13 has been passed partly around a chain wheel 14 on the turning and driving roller 6 for the conveyor 3, partly around a freely rotatably supported chain wheel 15 driven by the first chain 10. Reference numeral 16 denotes a tensioning chain wheel.

The rotational direction 17 of the freezing drum 7 is anti-clockwise.

The fish fillets F to be treated within the machine, are supplied on the conveyor 3, skin side facing upwards.

The freezing drum 7 works according to a principle known per se in fish treatment generally, namely that a moist fillet F at the skin side is frozen to the mantle face 7' of the freezing drum 7, where the fillet is hold firmly through the ice formed while it is moved towards and past a cutting tool, e.g. in the form of a driven, endless band knife 18 of a design known per se.

Two rotatable scraper means are denoted at 19, 20. They serve to scrape off fish skin and fat tissue frozen to the drum 7.

As previously mentioned, the conveyor 3 has, partly due to its design, shape and inherent material properties, partly due to the way it is supported, a certain elastic resilience. In the delivery area for the fillets from the conveyor 3 to the freezing drum 7, the upper part of the conveyor passes through a longitudinal deflection distance. Support rollers 21, 22, 22' and 23 define the deflection portion 3' of the upper part of the conveyor 3. The support rollers 22, 22' may be constituted by three independent rollers or by a graduated roller having a central portion 22 having the largest diameter and two outer portions 22' having a smaller diameter. Considering the cross-section through a fillet F in FIG. 2, it should be clear that the fat tissue portion VP of this fillet F is supported by means of the conveyor cords 3a which are supported by the roller portion 22 having the largest diameter. Thus, the central portion of the fillet, including the fat tissue portion VP, is supported by the conveyor cords 3a positioned at a higher level than the conveyor cords 3a supporting the outer fillet portions. This secures that the fat tissue portion gets the opportunity of being pressed into the circumferential groove 7a of the freezing drum 7 before the remaining fillet portions are firmly adhered to the mantle face 7' of the freezing drum 7 through freezing, counteracting said pressing-in of fat tissue into said groove.

In order to increase or decrease the tensioning of the conveyor 3 to cause the latter to press with a larger or smaller force in the direction towards the drum 7, one of these support rollers, namely the graduated roller 22, 22' and/or the roller 23; possibly two side rollers 22', one central roller 22 and/or the roller 23 can be controllable at least in the vertical direction.

Figure 2:
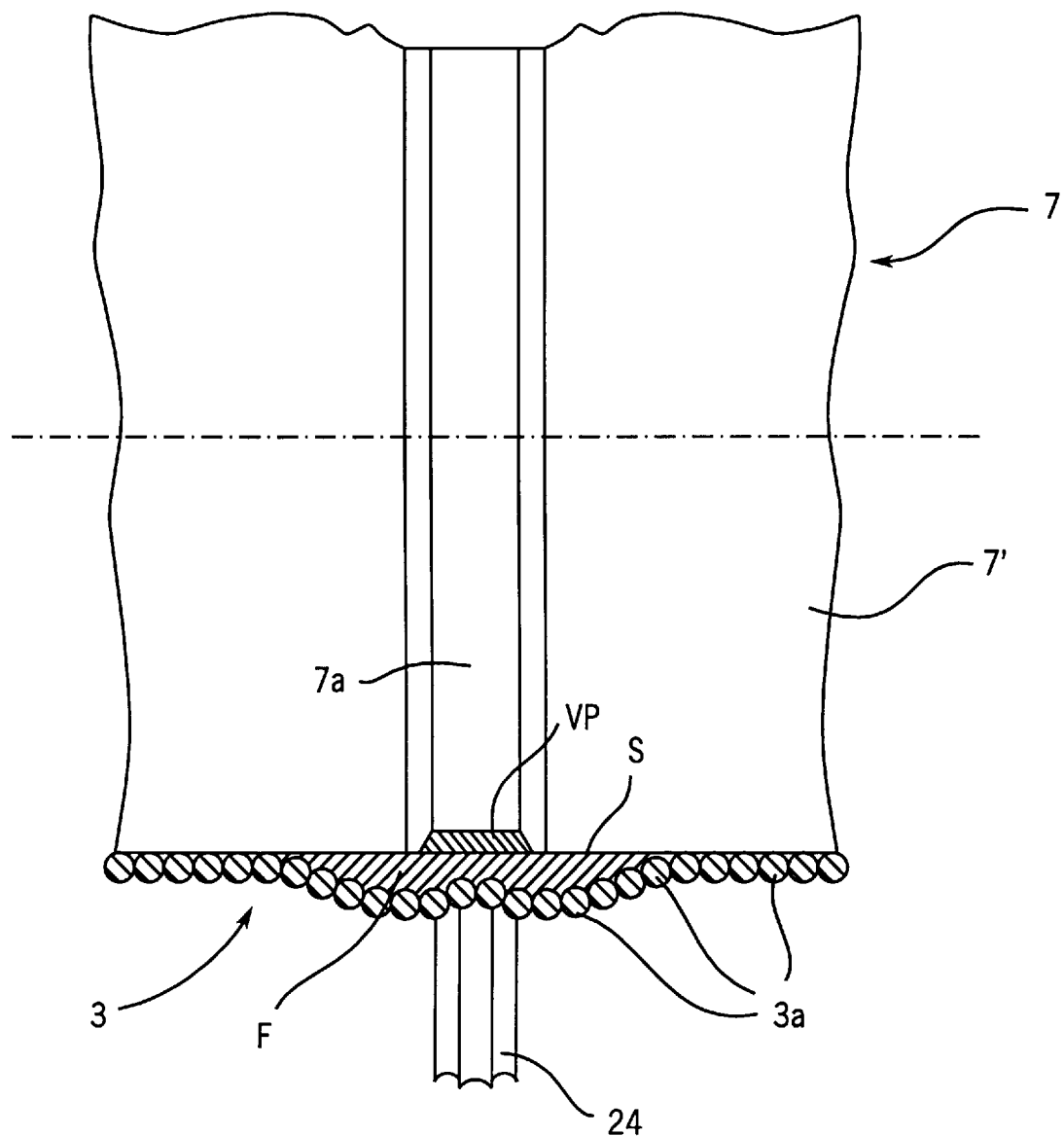
FIG. 2 shows a vertical section through supply conveyor and fillet, undesired fat tissue portion being pressed from below into a circumferential groove of the freezing drum by means of the conveyor upon the delivery of the fillet to the freezing drum, clearly illustrating the controllable flexibility of the conveyor and the adaptation thereof to the shape of the fillet in the width direction of the conveyor, shown on a larger scale than in FIG. 1.
Figure 3:
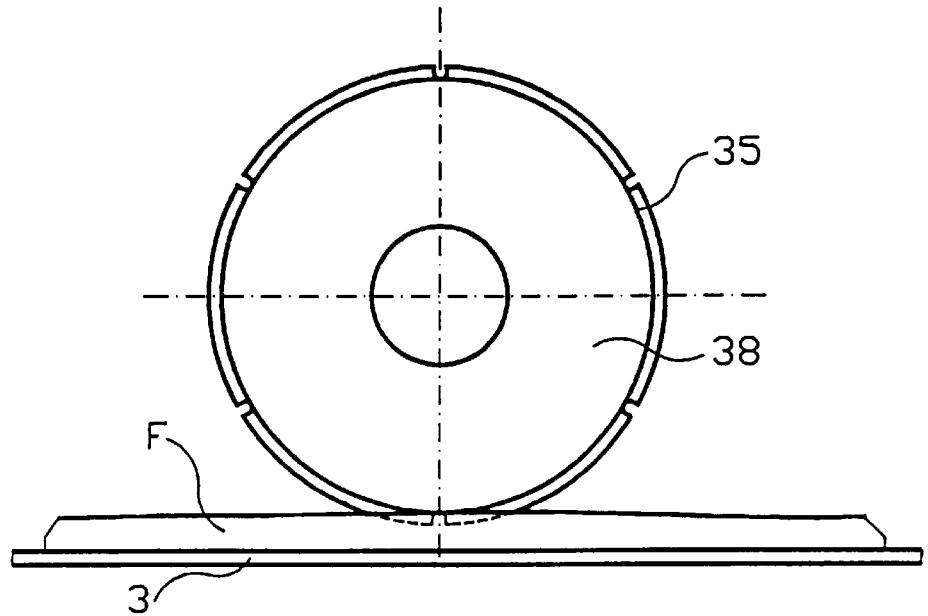
FIG. 3 shows a side elevational view of a rotary circle knife disposed aligned with the groove of the freezing drum, in front of the latter, and which cuts a scratching through the skin of the fillet, along the middle of the fat tissue portion.

Additionally, in order to secure that the fat tissue portion VP of the fillet is pressed reliably into the circumferential groove 7a of the freezing drum 7, a displaceable press roller 24 has been disposed in the exemplary embodiment in lieu of the previously mentioned support roller 22, FIG. 2. The press roller 24 is mounted on one end of a spring-loaded (25) angular rod 26 adapted to rotate about the same shaft on which the support roller 21 is mounted.

As mentioned, the invention aims at providing a machine for simple and efficient cutting away said longitudinal fat tissue portion VP from fillets. This is realized by providing the freezing drum 7 with at least one circumferential groove 7a, into which the fat tissue portion VP is pressed by the pressing effect exerted from below/upwardly on the fillet by the conveyor 3 due to shape, design, material properties, support and tensioning of the latter, possibly by further help from a press roller 24, causing the fat tissue portion VP to be pressed into the circumferential groove prior to the cutting process proper taking place.

Together with the skin side resting against the mantle face 7' of the freezing drum 7, the fat tissue portion VP within the freezing drum groove 7a is frozen firmly to the groove-defining wall faces within the groove, thus being fixed and retained prior to the following cutting operation, which is performed by the cutting edge of the band knife 18, cutting the fillet F free, separating it from skin and fat tissue portion, skin S and fat tissue VP still being frozen to the freezing drum until these waste products are removed by means of the scraper means 19, 20.

Cutting away said fat tissue in combination with skinning may possibly be carried out in connection with cutting fillet pieces parallel to the two opposite main faces of the fillet. To this end, for the displaceable suspension of the band knife 18, a bracket 28 has been mounted on the machine frame 1, the frame 27 of the band knife 18 being pivotally disposed in the bracket 28 by means of a horizontal rotational shaft 29. An arm 30 of the band knife frame 27 is in engagement with a drive device 31 for turning the frame 27 and the cutting edge of the band knife 18 in relation to the freezing drum 7. This drive device 31 can be operated from a steering wheel 32 for manual skin thickness-adjustment, possibly fish piece thickness-adjustment, or it can be controlled electronically.

Reference numeral 33 denotes an outlet chute for scraped-off waste 34, FIG. 1, in the form of fat tissue and skin scraped off from the drum mantle face 7' and the circumferential groove 7a by means of the scraper means 19, 20.

In front of the freezing drum 7, above the conveyor 3, a rotary circle knife 35 has been disposed, the knife 35 being driven by a motor 36 and adapted to cut a longitudinal scratching through the skin S, centrally above the fat tissue portion VP of the fillet F when the latter passes the knife 35, lying on the conveyor 3, skin side facing upwardly. Just behind the circle knife 35 and immediately above the conveyor 3, a guide strip 37 is disposed, the strip being adapted to carry the fillet F further in correct position towards the circumferential groove 7a of the drum 7, the guide strip 37 engaging into the above-mentioned scratching through the skin S of the fillet when the latter is transported towards the drum 7. The longitudinal scratching through the skin also causes the fillet to be more compliant when the fat tissue portion thereof is pressed into the circumferential groove 7a of the drum 7.

On both sides the circle knife 35 is equipped with a circular plate 38 having a slightly smaller diameter than the circle knife, thus determining the depth of said scratching.

We claim:

1. A machine for cutting away undesired tissue (VP) e.g. a fat tissue portion, from fillets/pieces of meat, e.g. fish fillets (F), said undesired tissue (VP) extending substantially in one main direction, e.g. in the longitudinal direction of a fish fillet, comprising a rotary freezing drum (7) for freezing of fillets (F) thereto, in order to retain the fillets, with the longitudinal direction of the undesired fat tissue portion orientated in the circumferential direction of the freezing drum (7), while a knife (18), e.g. in the form of a driven endless band knife, cuts a fish meat slice (FS) loose from the freezing drum (7), a conveyor (3) being adapted to supply fillets (F) to the freezing drum (7), characterized in that the freezing drum (7) is formed with at least one circumferential groove (7a) receiving said fat tissue portion (VP), the underlying conveyor (3; 3a), through the shape, design and suspension thereof, being adapted to press said fat tissue portion (VP) into said groove (7a) in which the fat tissue portion (VP) freezes and, thus, is retained, withdrawn from the drum mantle face (7') when the knife (18) cuts loose a fish slice (FS) freed from said fat tissue portion.

2. A machine as set forth in claim 1, characterized in that the conveyor (3) comprises parallel, elastic cords (3a) extending in the longitudinal direction of the conveyor, coinciding with the feeding direction for the fillets (F) towards the freezing drum (7).

3. A machine as set forth in claim 2, characterized in that the tensioning degree of the elastic cords (3a) is controllable, in order to be capable of varying the upwardly directed force which the elastic cords (3a) can exert on the fillet (F) from below.

4. A machine as set forth in claim 3, characterized in that the elastic cords (3a) upstream relative to the freezing drum (7) are supported on partly a central roller/roller section (22) having a larger diameter than coaxial outer rollers/roller sections (22').

5. A machine as set forth in claim 4, characterized in that the central roller (22) and/or the outer rollers (22') are vertically controllable.

6. A machine as set forth in claim 4, characterized in that the central roller/roller section (22) is replaced by a displaceable press roller (24).

7. A machine as set forth in claim 6, characterized in that the press roller (24) is suspended at one end of a spring-loaded (25), turnable rod (26).

8. A machine as set forth in claim 1 characterized in that a cutting means (35) has been disposed in front of the freezing drum (7), above the conveyor (3), said cutting means (35) being adapted to cut a longitudinal scratch/slit through the skin (S), centrally above the fat tissue portion (VP) when the fillet is carried past said cutting means.

9. A machine as set forth in claim 8, characterized in that a guide strip (37) is disposed behind the cutting means (35), said guide strip (37) being adapted to conduct the fillet (F) further on in correct position towards the circumferential groove (7a) of the drum (7), the guide strip (37) engaging into the above-mentioned longitudinal slit extending through the skin (S) on the fillet (F) when the latter is transported towards the drum (7).

10. A machine as set forth in claim 8, characterized in that the cutting means (35) is a circle disc knife, and that it, on both sides thereof, is equipped with a circular plate (38) having a slightly smaller diameter than the circle knife (35), thus determining the slit depth.

* * * * *